May 3, 1938.　　　　P. E. CAHOW　　　　2,116,382
SMOKING PIPE
Filed March 17, 1937
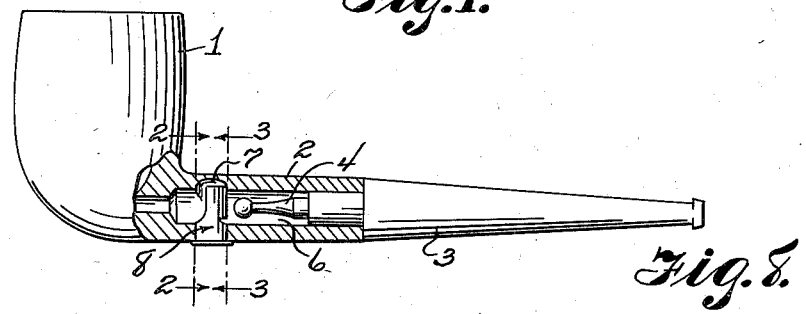
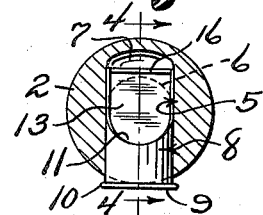
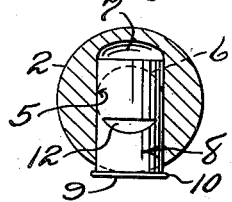
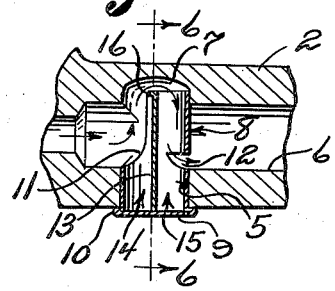
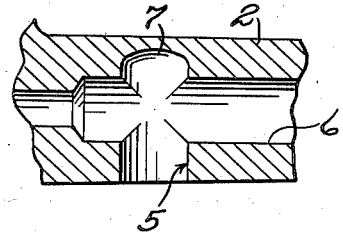
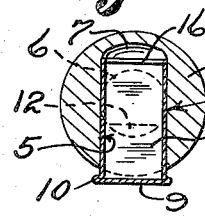
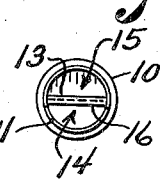
Percy E. Cahow
INVENTOR
BY Victor J. Evans & Co.
ATTORNEYS Patented May 3, 1938

2,116,382

UNITED STATES PATENT OFFICE 2,116,382

SMOKING PIPE

Percy E. Cahow, Fort Lauderdale, Fla.; Ervin Cahow, administrator of said Percy E. Cahow, deceased Application March 17, 1937, Serial No. 131,473

2 Claims. (Cl. 131—12)

This invention relates to smoking pipes, and its general object is to provide a pipe that includes a trap which not only diverts the smoke to cool the same, as well as blocks, collects and prevents the passage of particles of tobacco, other matter and unpleasant products of combustion and the like from the bowl of the pipe to the mouth piece but condenses and collects the moisture in the smoke, with the result the latter is cooled, cleaned and dried before it reaches the mouth piece.

A further object is to provide a pipe that includes a trap which is capable of performing all of the above functions, yet will not interfere with free drawing or passage of the smoke, and can be easily installed in any pipe now in general use, without materially changing the structure of the pipe or the appearance thereof, in that the trap is practically concealed from view.

Another object is to provide a pipe that includes a trap of the character set forth, which is simple in construction, inexpensive to manufacture, can be easily applied and removed with respect to the pipe, will not interfere with cleaning of the pipe in the usual manner by the so-called pipe cleaners and the like, and is extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of a pipe constructed in accordance with the present invention, with a part of the stem and bowl broken away to illustrate the application of the trap thereto.

Figure 2 is a sectional view taken on line 2—2 of Figure 1.

Figure 3 is a sectional view taken approximately on line 3—3 of Figure 1.

Figure 4 is a sectional view taken through the trap in applied position and shows by arrows the course taken by the smoke, in passing about the trap and through the same.

Figure 5 is a sectional view illustrating the only change that is necessary in the pipe structure to apply my trap thereto.

Figure 6 is a sectional view taken approximately on line 6—6 of Figure 4.

Figure 7 is a top plan view of the trap per se.

Figure 8 is a perspective view of the partition or baffle plate of the trap.

Referring to the drawing in detail, the reference numeral 1 indicates the bowl of the form of pipe shown, 2 the stem and 3 the mouth piece, the latter being frictionally mounted in the stem and having a grooved insert member 4 frictionally secured in the inner end thereof.

All of the foregoing structure is well known and is shown and described in order to disclose the present invention, which in fact is a trap capable of being associated with any type of smoking or tobacco pipe, and for that purpose, the stem is provided with a bore 5 which extends from the bottom of the stem, through the smoke passage 6 thereof, and above the passage to provide what may be termed a smoke chamber 7, as best shown in Figure 5 of the drawing. The bore 5 may be disposed at any place along the length of the stem, but is preferably disposed adjacent to the juncture of the stem with the bowl 1, as shown in Figure 1.

The trap includes a hollow cylindrical body 8 of a size to fit within the bore, and the body may be frictionally mounted or threadedly secured therein. In any event, the body is of a height to extend into the smoke chamber 7 so as to bridge and close the smoke passage 6, and has an open upper end and a closed lower end or bottom 9, the latter being preferably integral with the vertical wall of the body and formed thereon to provide a flange 10 engageable with the lower surface of the stem to not only limit the application of the trap within the bore 5, but to provide means to receive a knife or finger nail of the user to facilitate the removal of the trap from the bore.

The wall of the cylindrical body is cut away as at 11, from diametrically opposite points at the upper end thereof, to a point that is preferably below the transverse center of the body, to provide a recess in the wall which when the trap is in applied position, faces the bowl, as best shown in Figure 1. The portion of the wall opposed to the recess or cut away portion 11 is provided with a substantially crescent shape slot 12, and the lower end of the slot as well as the lower end of the recess is preferably flush with the lower portion of the smoke passage 6, as best shown in Figure 4.

It will be obvious that the hollow cylindrical body with its bottom 9 and open upper end provides what may be termed a container that is substantially cup-shaped, and disposed vertically therein across the diameter thereof is a partition 13 which divides the container into chambers 14 and 15. The partition is co-extensive with the height of the body 8 and frictionally fits therein for vertical movement and formed on the upper end of the partition is a flange 16 to facilitate the movement thereof, it being apparent that the flange acts as a finger piece, and by that construction it will be seen that the partition can be readily removed from the container and adjusted therein, and the adjustable feature thereof makes it possible to control the flow of the smoke and the draft to a certain extent. However, the partition may be fixed, but is preferably adjustable. When the partition is raised above the bottom 9 of the container, a passage will be provided between the bottom and the lower edge of the partition to allow smoke to pass therethrough, especially when the container is empty, but when solid matter and liquid accumulate therein, such will close or partially close that passage, consequently all or the maximum amount of smoke must pass through the chamber 7. In any event, the partition directs smoke through the smoke chamber, which acts to cool the same, and when the smoke contacts the partition or baffle plate, it will be obvious that the moisture therein is condensed and collects within the chamber 14, which also acts to receive all solid matter and the like from the bowl and prevents the same from passing to the mouth piece. The chamber 15 likewise receives liquid produced by condensation and saliva which may pass through the mouth piece, consequently it will be seen that the smoke is cooled, cleaned and dried before it reaches the mouth of the user.

It might be mentioned, that while the upper wall of the smoke chamber 7 is shown as being concaved and the bottom 9 of the trap is flat, the former may be convexed and the latter concaved. In the event the bottom 9 is concaved, or the inner surface thereof is formed in concaved formation, the lower edge of the partition 13 is curved to follow the shape thereof, and the partition which is shown as being straight may be corrugated, and the corrugations preferably extend transversely thereof.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A smoking pipe comprising a bowl, a stem and a mouth piece, said stem having a bore therein extending through the bottom and the smoke passage thereof to provide a smoke chamber in the wall above the passage, a container detachably mounted in the bore and having an open top disposed within the chamber, said container having a flanged lower end to limit the movement thereof in the bore and to facilitate its removal therefrom, a removable partition providing a baffle disposed vertically within the container across the diameter thereof for frictional engagement therewith, means on the upper end of the partition to facilitate the removal thereof, said partition being co-extensive with the height of the container and dividing the latter into chambers, one of said chambers having an open wall portion directed toward the bowl and the lower edge of the open portion being flush with the lower edge of the smoke passage, the other chamber having an opening in its wall directed toward the mouth piece and disposed a considerable distance above the bottom of its chamber, and said opening being substantially crescent shape with its curved edge lowermost and disposed flush with the bottom of the smoke passage.

2. A smoking pipe comprising a bowl, a stem and a mouth piece, said stem having a bore therein extending through the bottom and the smoke passage thereof to provide a smoke chamber in the wall above the passage, a container detachably mounted in the bore and having an open top disposed within the chamber, said container having a flanged lower end to limit the movement thereof in the bore and to facilitate its removal therefrom, a removable partition providing a baffle disposed vertically within the container across the diameter thereof for frictional engagement therewith, said partition being co-extensive with the height of the container and equally dividing the latter into chambers, one of said chambers having an open wall portion directed toward the bowl, the other chamber having an opening in its wall directed toward the mouth piece, said partition being adjustable and movable vertically for that purpose into and out of the smoke chamber to vary the flow of the smoke therethrough, and a flange on the upper end of the partition and providing a finger piece to facilitate the removal and adjustment thereof.

PERCY E. CAHOW.